(12) United States Patent
Lu

(10) Patent No.: US 7,278,770 B2
(45) Date of Patent: Oct. 9, 2007

(54) DOUBLE-SIDED LIGHT BOX

(75) Inventor: Tai-Wan Lu, Shulin (TW)

(73) Assignee: Safe Fire Protection Equipment, Taipei Hsien (TW)

( * ) Notice: Subject to any disclaimer, the term of this patent is extended or adjusted under 35 U.S.C. 154(b) by 132 days.

(21) Appl. No.: 11/200,108

(22) Filed: Aug. 10, 2005

(65) Prior Publication Data
US 2007/0035945 A1 Feb. 15, 2007

(51) Int. Cl.
G09F 13/18 (2006.01)
(52) U.S. Cl. ............... 362/604; 362/605; 362/632; 362/634; 362/633; 40/611.02; 40/611.05; 40/611.03; 40/611.11
(58) Field of Classification Search ........ 362/604–609, 362/600, 632–634, 396, 614, 616, 219–220, 362/427, 374–375, 274; 40/781–782, 792–793, 40/795–796, 606.18, 611.02, 611.05, 611.03, 40/611.11, 546, 779, 606.16, 570, 574, 611.01
See application file for complete search history.

(56) References Cited
U.S. PATENT DOCUMENTS
6,729,057 B1 * 5/2004 Lu .................... 40/611.02
6,871,975 B2 * 3/2005 Chuang ................ 362/27
7,033,034 B2 * 4/2006 Oh .................... 362/616
7,146,759 B2 * 12/2006 Bell ................... 40/734

* cited by examiner

Primary Examiner—Renee Luebke
Assistant Examiner—Robert May
(74) Attorney, Agent, or Firm—Lowe Hauptman Ham & Berner, LLP

(57) ABSTRACT

A structure for double-sided light box, comprising a frame having a plurality of wiring ducts disposed on its inner surface for placing electric wires, said frame having two trenches correspondingly disposed on an outer rim of said frame, an upper and a lower lid pivotally connected to said trench with a plurality of spring blades disposed among said upper and said lower lid and said frame to fixedly hold said upper and said lower lid to said frame by means of a elastic force of the spring blades; a recess being disposed at a inner rim for holding surrounding edges of a lighting component and a double-sided backlight module; said backlight module having its upper and lower surface attached to one advertising panel respectively, with said upper and said lower lid clasping fixedly advertising panels and said backlight module; when said lighting component generating a first light source, said first light source projecting light on said backlight module to let said upper and lower surface of said backlight module to generate second and third light sources, which in turn display the two advertising panels through second and third light sources of said backlight module to implement two-way advertisement.

1 Claim, 6 Drawing Sheets

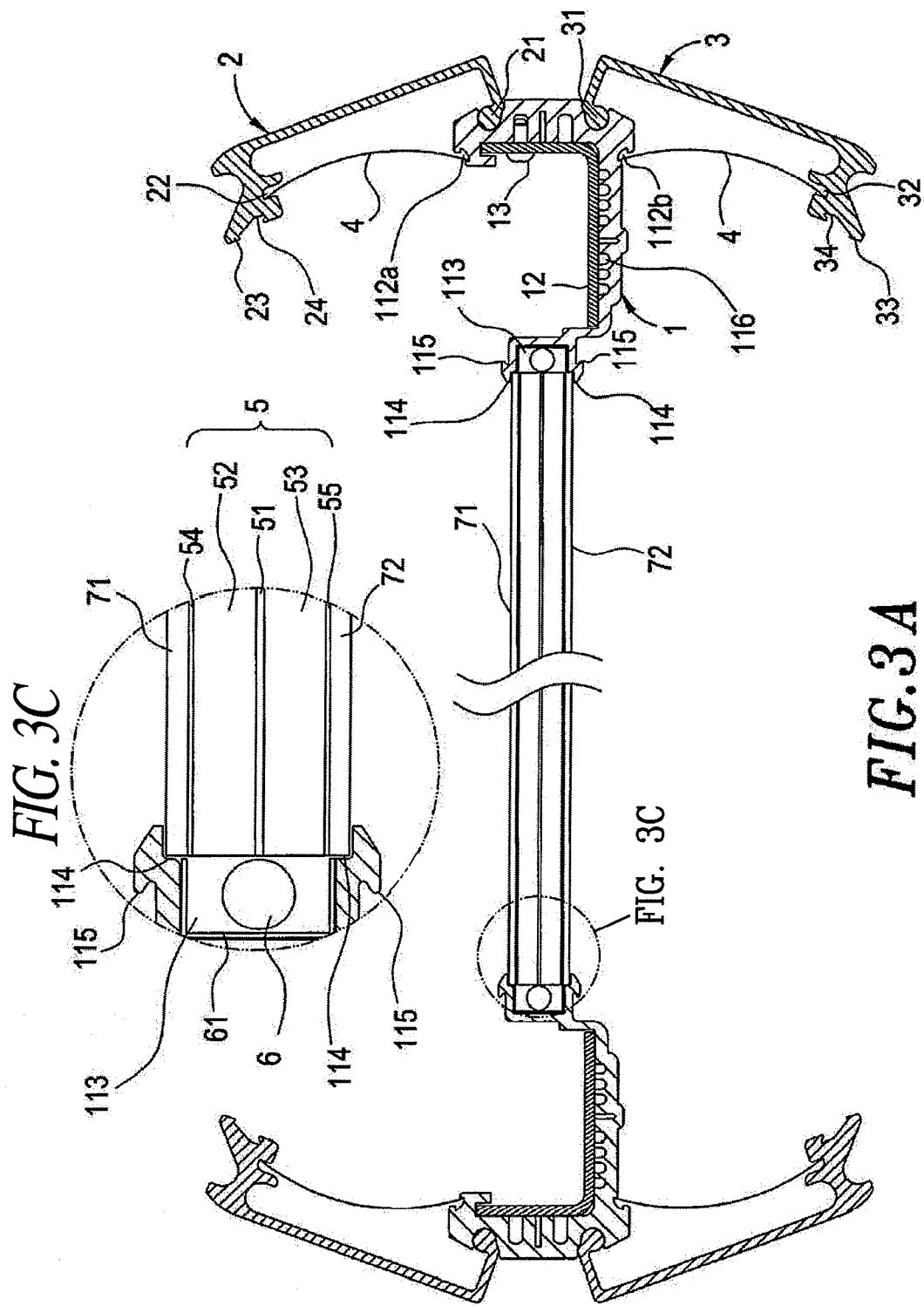

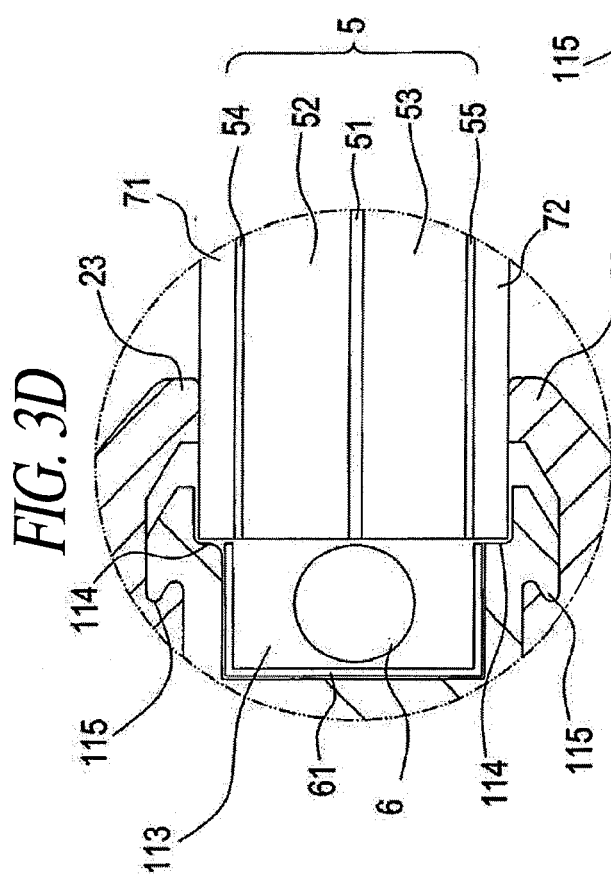
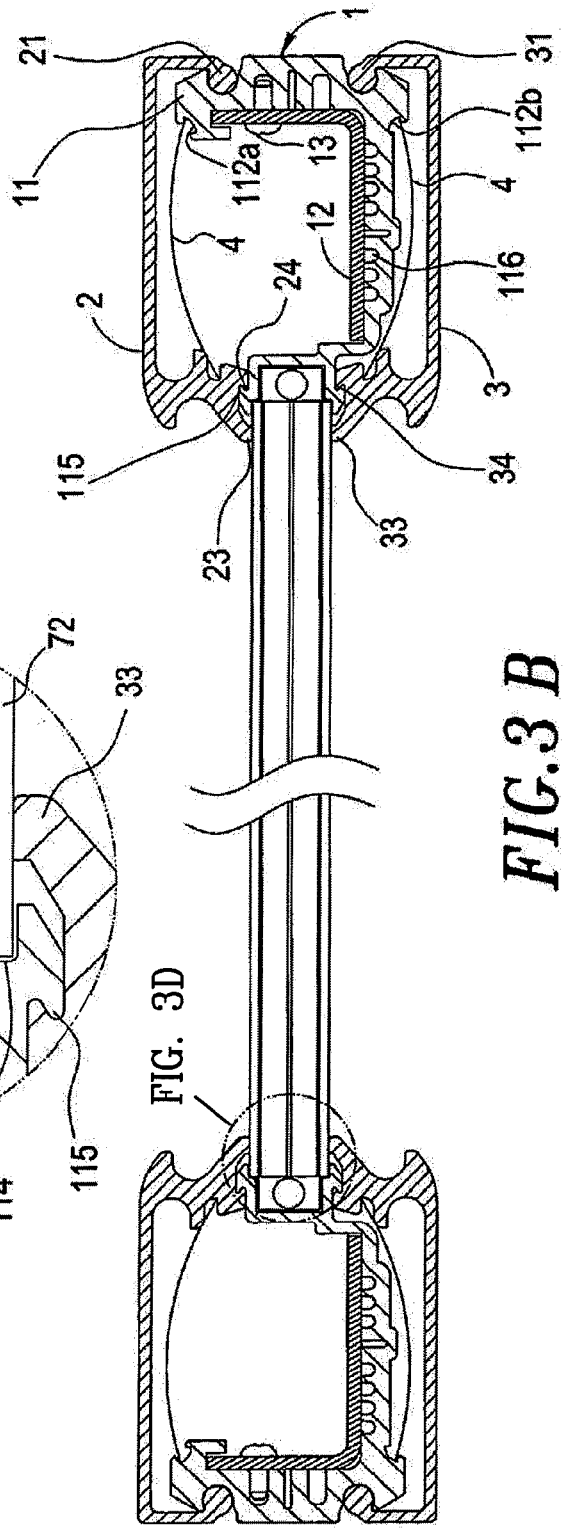

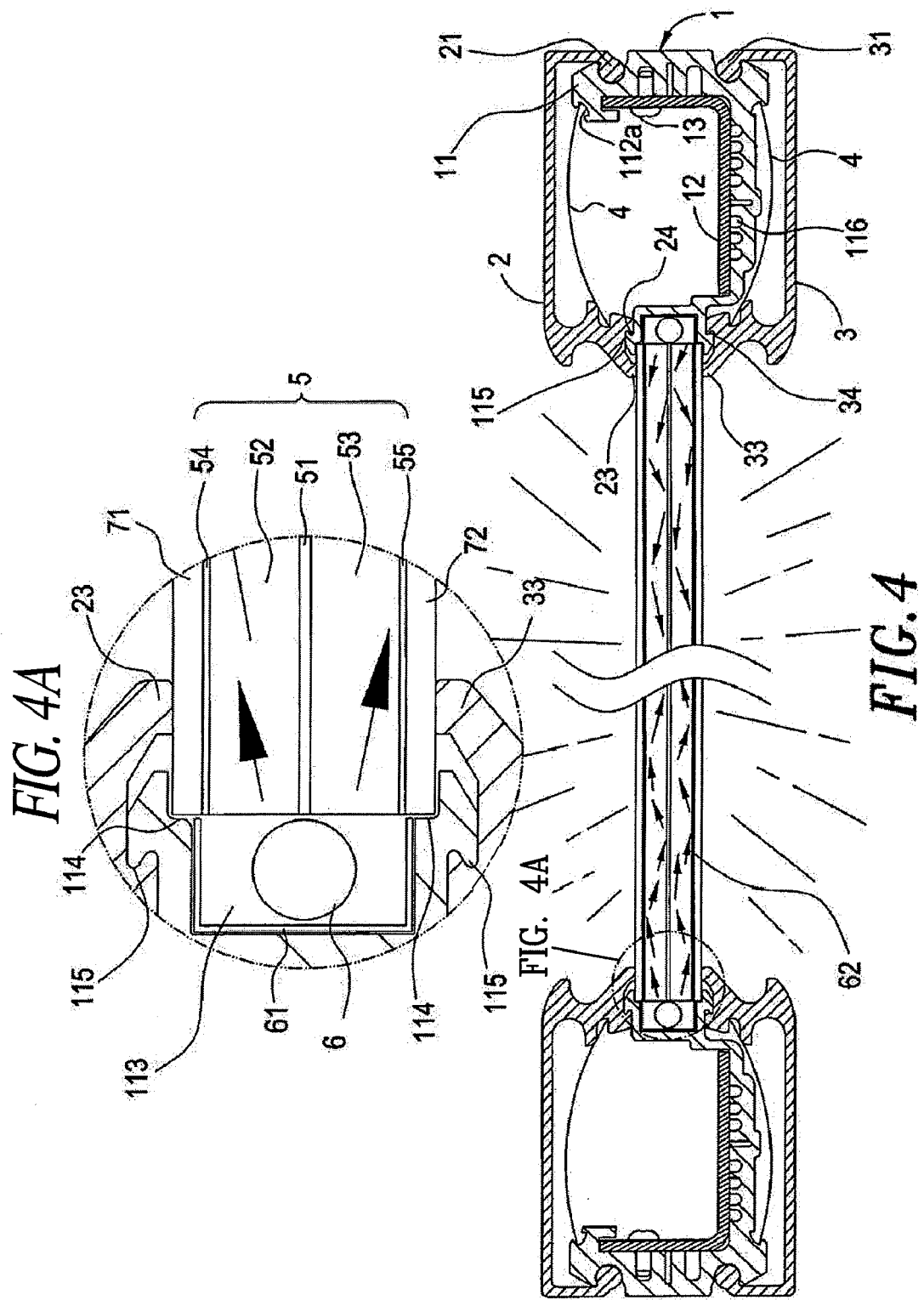

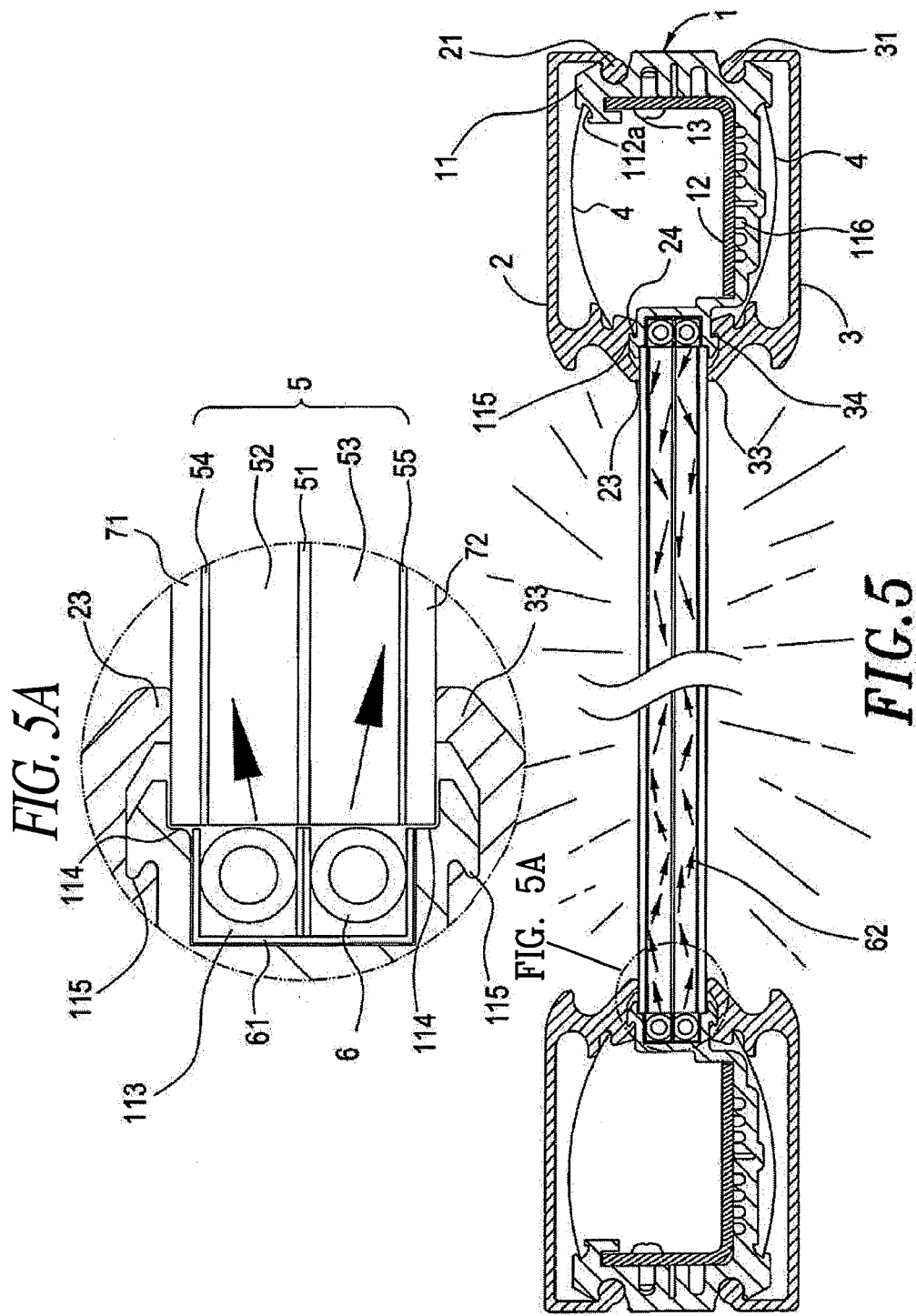

DOUBLE-SIDED LIGHT BOX

BACKGROUND OF THE INVENTION

1. Field of the Invention

The present invention is related to a structure for a double-sided light box, more particularly, to a structure for a double-sided light box capable of displaying advertisement from both sides.

2. Description of the Prior Art

A prior-art light box has a frame comprising a upper frame, a lower frame, a connecting plate and a positioning base, wherein the upper frame is a flat sheet of lid, having a pivot formed on one side, a positioning area formed between the pivot and the upper frame; the other side of the upper frame comprising a flat sheet having a trench; the lower frame having a container tank with an outer slot and a inner slot disposed on one side, the outer slot having a opening longer than the radial length of the pivot of the upper frame, the inner slot of the container tank having one end of the spring blade disposed within; the connecting plate being a flat sheet, having a tab extending from its one side; the positioning base being a L-shaped sheet with a plurality of through holes disposed on each side thereof, a protruding L-shaped base being disposed inside the L-shaped sheet, the protruding base having its one end connected to the positioning base through a fixed block and another movable end having a plurality of tabs disposed therein; the pivot of the upper frame being wedged to the outer slot of the lower frame and locked to the edge of outer slot of the lower frame through the connecting plate, while the tab of the connecting plate resting on the edge of outer slot of the lower frame, and the pivot of upper frame being fixedly held inside the outer slot of lower frame; another end of the spring blade being disposed in the trench of upper frame, two adjacent lower frames connecting to each other through a fixed block passing through the positioning base and the lower frames.

The main shortcoming of this implementation is that the light box frame can only provide single-sided advertisement display without two-way advertising capability.

Therefore, the above-mentioned devices present several shortcomings to be overcome.

In view of the above-described deficiency of prior-art light boxes, after years of constant effort in research, the inventor of this invention has consequently developed and proposed a structure for a double-sided light box.

SUMMARY OF THE INVENTION

It is an object of the present invention to provide a double-sided light box having two-way advertisement capability.

It is another object of the present invention to provide a structure for a double-sided light box for users to open up the upper and the lower lid without any tools and to easily change the advertising panel.

It is another object of the present invention to provide a simple, easy-to-disassemble and high-availability structure to implement light box.

The present invention discloses a structure for double-sided light box, comprising a rectangular frame, four upper and lower lids and a spring blade, the rectangular frame having a plurality of wiring ducts disposed on its inner surface for placing electric wires, the rectangular frame having two trenches correspondingly disposed on an outer rim of the rectangular frame, a recess being disposed at the inner rim for holding surrounding edges of a lighting component and a double-sided backlight module; the backlight module having its upper and lower surface attached to a advertising panel respectively; the four upper and lower lids pivotally connected to the corresponding trench of the rectangular frame, with a plurality of spring blades disposed among the upper and the lower lids and the frame to fixedly hold the upper and the lower lids to the rectangular frame by means of a elastic force of the spring blades; while the upper and the lower lids clasping fixedly advertising panels and the backlight module to keep the advertising panels and the backlight module from breaking away; when the lighting component generating a first light source, the first light source projecting light on the double-sided backlight module to let the upper and lower surface of the backlight module to generate second and third light sources, which in turn display the two advertising panels through the second and third light sources of the backlight module to implement two-way advertisement.

These features and advantages of the present invention will be fully understood and appreciated from the following detailed description of the accompanying Drawings.

BRIEF DESCRIPTION OF THE DRAWINGS

FIG. 3A schematically illustrates a cross-sectional view of the structure for a double-sided light box of the present invention;

FIG. 3B schematically illustrates a cross-sectional view of the structure for a double-sided light box of the present invention;

FIG. 3C is an enlarged portion of the structure shown in FIG. 3A;

FIG. 3D is an enlarged portion of the structure shown in FIG. 3B;

FIG. 4 schematically illustrates a cross-sectional view of the implementation of the structure for a double-sided light box of the present invention;

FIG. 4A is an enlarged portion of the structure shown in FIG. 4;

FIG. 5 schematically illustrates a cross-sectional view of another implementation of the structure for a double-sided light box of the present invention; and FIG. 5A is an enlarged portion of the structure shown in FIG. 5.

DETAILED DESCRIPTION OF THE PREFERRED EMBODIMENT

Figures 1, 1A:
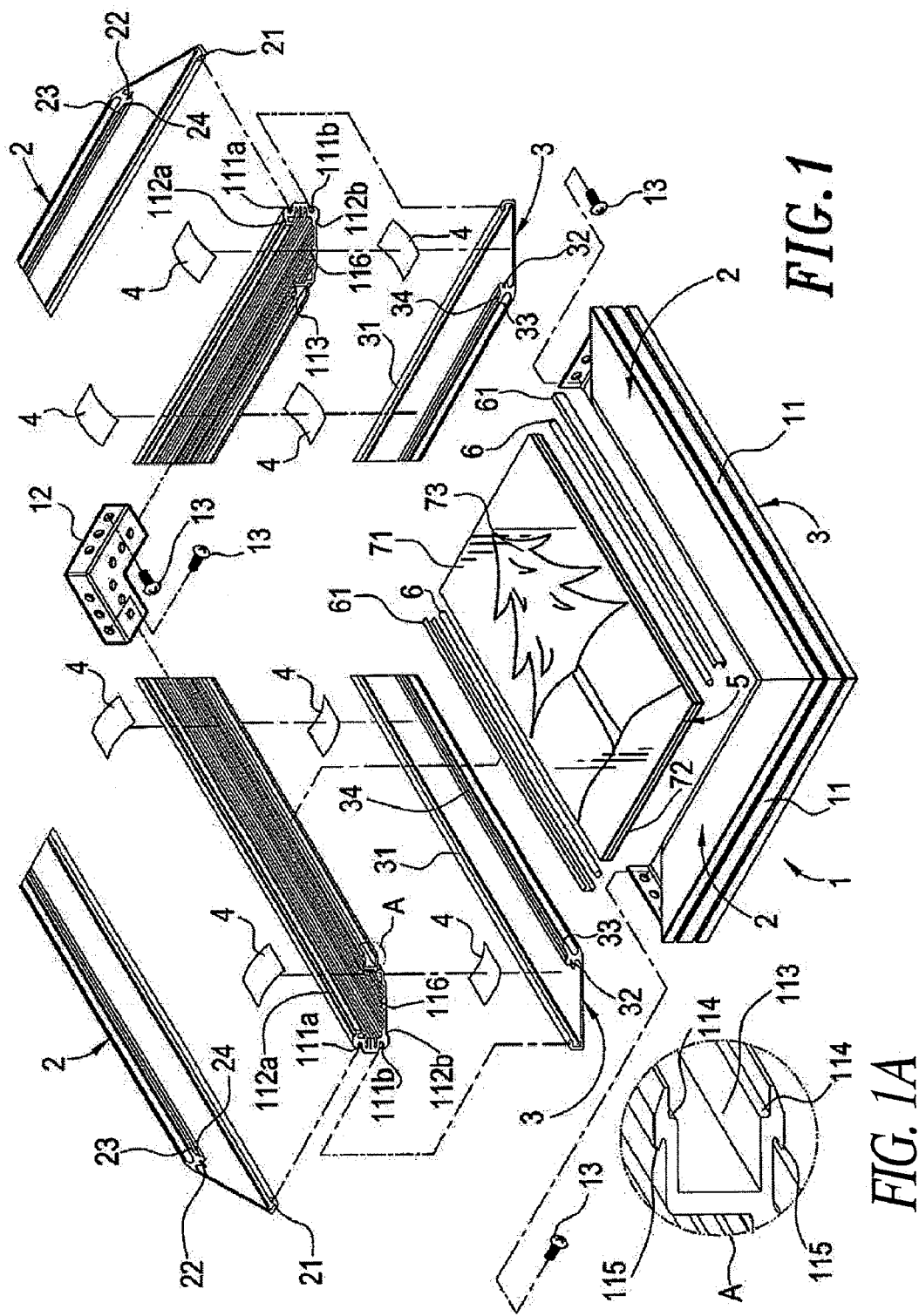
FIG. 1 schematically illustrates a decomposition view of the structure for a double-sided light box of the present invention.
FIG. 1A is an enlarged portion of the structure shown in FIG. 1.
Figure 2:
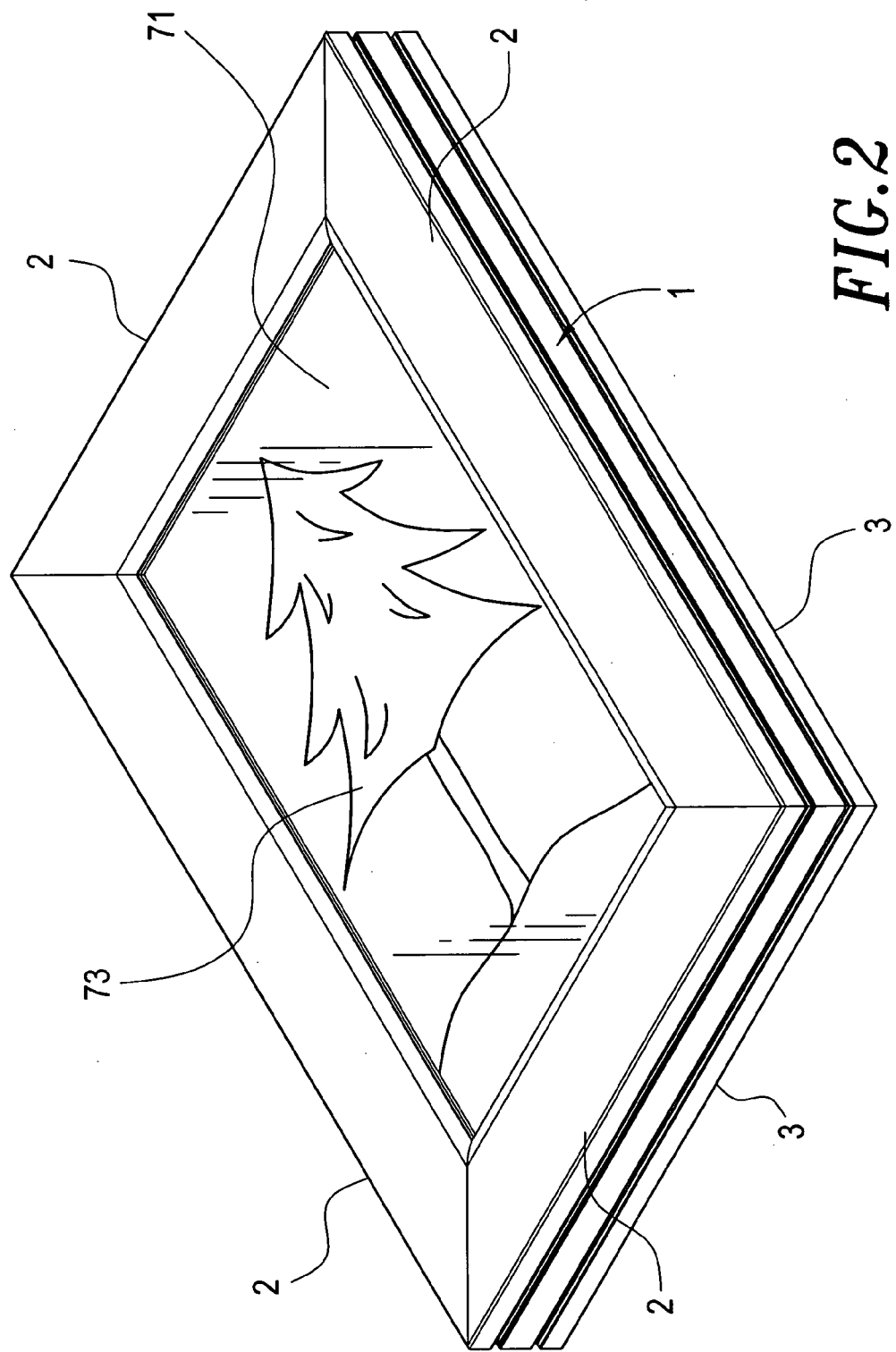
FIG. 2 schematically illustrates a 3-D view of the structure for a double-sided light box of the present invention.

Please refer to FIG. 1 to 5A for a structure of double-sided light box in the present invention which comprises:

a rectangular frame 1, the rectangular frame 1 comprising four roughly L-shaped positioning brackets, each positioning bracket having its both end being inclined planes to connect to each other to form the rectangular frame 1, a plurality of wiring ducts 116 for keeping electric wires together, the wiring duct 116 being disposed at the inner surface of the positioning bracket 11; two positioning brackets 11 being connected by roughly L-shaped positioning plate 12 and being fastened by a screw to closely hold corresponding ends of two positioning bracket 11 together, L-shaped positioning plate 12 pressing the electric wires in the wiring duct 116 and keeping them in position; each positioning bracket 11 having trenches 111a and 111b correspondingly disposed at the outer surface thereof, and slots 112a, 112b disposed at the top edge and the bottom edge thereof, and a roughly C-shaped recess 113 disposed at the inner rim, the recess 113 having a step 114 disposed at each side closing to its front, and a fastener block 115 being disposed outside the recess 113 at each side closing to the front of recess 113.

four roughly arcuate upper lids 2, each one of the upper lids 2 having a pivot block 21 disposed at its rear end and a positioning slot 22 disposed at a inner rim of its front end, a retaining plate 23 extending outward from an outer end of the positioning slot 22, a fastener slot 24 being disposed on the retaining plate 23; the pivot block 21 of each one of the four upper lids 2 connecting pivotally to the trench 111a of rectangular frame 1, and the fastener slot 24 of retaining plate at the front end of upper lid 2 clasping the fastener block 115 of the recess of rectangular frame 1, thus four upper lids covering and connecting to four rims of the rectangular frame 1, while the retaining plate 23 at the front end of each one of upper lids 2 stretching and exposing from the inner rim of the frame 1;

four roughly arcuate lower lids 3, each one of lower lids 3 having a pivot block 31 disposed at its rear end and a positioning slot 32 disposed at a inner rim of its front end, a retaining plate 33 extending outward from an outer end of the positioning slot 32, a fastener slot 34 being disposed on the retaining plate 33; the pivot block 31 of each one of the four lower lids 3 connecting pivotally to the trench 111a of rectangular frame 1, and the fastener slot 34 of retaining plate at the front end of lower lid 3 clasping the fastener block 115 of the recess of rectangular frame 1, thus four upper lids covering and connecting to four rims of the rectangular frame 1, while the retaining plate 33 at the front end of each one of lower lids 3 stretching and exposing from the inner rim of the frame 1;

a plurality of spring blades 4, each of spring blades 4 having its one end inserted in top slot 112a of rectangular frame 1, the other end inserted in positioning slot 22 at the front end of upper lid 2, and a plurality of spring blades 4 disposed among slot 112b at the lower edge of rectangular frame 1 and the positioning slot 32 of lower lid 3 as well; spring blades 4 being distributed around four rims of rectangular frame 1, when each one of the upper and lower lids 2, 3 being lifted up from rectangular frame 1, spring blades 4 providing elastic force to fixedly hold the upper and lower lids in position to prevent them from disconnecting with rectangular frame 1 easily;

a double-sided backlight module 5, the double-sided backlight module 5 comprising a reflector 51, two light guide plates 52, 53 and two diffusers 54, 55; wherein two light guide plate 52, 53 attaching to a upper and a lower surface of reflector 51 respectively and two diffusers 54, 55 attaching to the surface of each one of light guide plate 52, 53 to form a five-layer structure; two lighting components 6 being disposed in a reflector mask 61, and reflector mask 61 containing the lighting components 6 being placed in two correspondingly disposed recesses 113 in rectangular frame 1, the rim of the layered backlight module 5 being disposed in recess 113 of rectangular frame 1 and held against step 114 of recess 113 to have the backlight module 5 disposed correspondingly to lighting component 6; advertising panels 71, 72 being attached to the surfaces of diffusers 54, 55 respectively, wherein the advertising panel comprises a light plate attaching to a transparent panel (not shown in figures), advertising panels 71, 72 being disposed in step 114 of recess of rectangular frame 1 and closely clasped by retaining plates 23, 33 of the upper and the lower lids 2, 3 to hold backlight module 5 and advertising panels 71, 72 fixedly disposed in rectangular frame 1;

When lighting component 6 generates a first light source, first light source 62 being reflected by reflector mask 61 to projecting light towards each side of light guide plates 52, 53 to let first light source 62 completely go into light guide plates 52, 53 and evenly distributed in light guide plates 52, 53 through diffusion points (not shown in figures) disposed on light guide plates 52, 53; while light not projecting into light guide plates 52, 53 being reflected by reflector 51 and back into light guide plates 52, 53 to make a second light source generated by light guide plates 52, 53 brighter; finally, diffusers 54, 55 diffusing the second light source to clearly display advertisement on two advertising panels 71, 72 to implement two-way advertisement.

Besides, two lighting components 6 can be disposed in a recess of one of the opposing sides of the frame respectively to let each one of light guide plate 52, 53 to aim at one lighting component 6 so as to improve the brightness of light guide plate 52, 53.

The advantages of the structure for a double-sided light box disclosed in the present invention are:

1. The present invention provides two-way advertisement capability to improve the function of the traditional single-sided advertising panel.

2. Users can open up the upper and the lower lid without any tools and easily change the advertising panel.

3. The present invention provides a simple, easy-to-disassemble and high-availability structure to implement light box.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A structure for a double-sided light box, comprising:
 a frame having a rim, an upper and a lower trench correspondingly disposed at said rim and a slot disposed at a top edge and a bottom edge of said rim respectively, and a recess disposed on said rim;
 a plurality of upper and lower lids, each one of said upper and lower lids having a front end, a rear end and a pivot block disposed at said rear end and a positioning slot disposed on said front end, a retaining plate extending outward from an outer end of said positioning slot;
 said pivot block of each one of said upper and said lower lids connecting pivotally to said upper and said lower trench of said frame, said retaining plate at said front end of each one of said upper and said lower lids stretching and exposing from said rim of said frame;
 a spring blade being inserted at each slot of said top edge and said lower edge and said positioning slot of each one of said upper and said lower lids, allowing each rim of said frame to be connected with spring blades;
 a lighting component, said lighting component being disposed in said recess of said frame;
 a double-sided backlight module having its rim disposed in said recess of said frame and corresponding to said lighting component, each surface of said backlight module attaching to an advertising panel respectively, said advertising panel also being disposed in said recess of said frame and clasped by said upper and said lower lid to fixedly hold said backlight module and advertising panels in said frame to implement two-way advertisement; and wherein a fastener block is disposed outside said recess of said frame at each side close to said recess and a fastener slot being disposed at each retaining plate of said upper and said lower lid; when said upper and said lower lid connecting to said frame, each fastener slot of said upper and said lower lid clasping said fastener block outside said recess of said frame.

* * * * *